Dec. 27, 1955   S. B. HOWARD   2,728,485
BOTTLE CARRIER
Filed April 13, 1953   7 Sheets-Sheet 1

INVENTOR.
SAM B. HOWARD
BY
Parott & Richards
ATTORNEYS

Dec. 27, 1955    S. B. HOWARD    2,728,485
BOTTLE CARRIER

Filed April 13, 1953    7 Sheets-Sheet 3

INVENTOR.
SAM B. HOWARD
BY
Parrott & Richards
ATTORNEYS

Dec. 27, 1955  S. B. HOWARD  2,728,485
BOTTLE CARRIER

Filed April 13, 1953  7 Sheets-Sheet 4

INVENTOR.
SAM B. HOWARD
BY
Parrott & Richards
ATTORNEYS

Dec. 27, 1955  S. B. HOWARD  2,728,485
BOTTLE CARRIER

Filed April 13, 1953  7 Sheets-Sheet 5

INVENTOR.
SAM B. HOWARD
BY
Parrott & Richards
ATTORNEYS

Dec. 27, 1955 S. B. HOWARD 2,728,485
BOTTLE CARRIER

Filed April 13, 1953 7 Sheets-Sheet 6

INVENTOR.
SAM B. HOWARD
BY
Parrott & Richards
ATTORNEYS

Dec. 27, 1955     S. B. HOWARD     2,728,485
BOTTLE CARRIER
Filed April 13, 1953     7 Sheets—Sheet 7
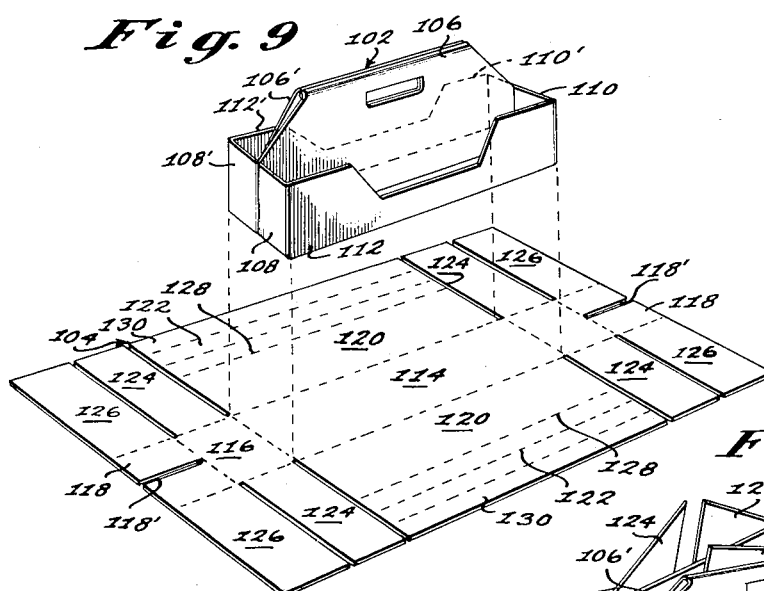
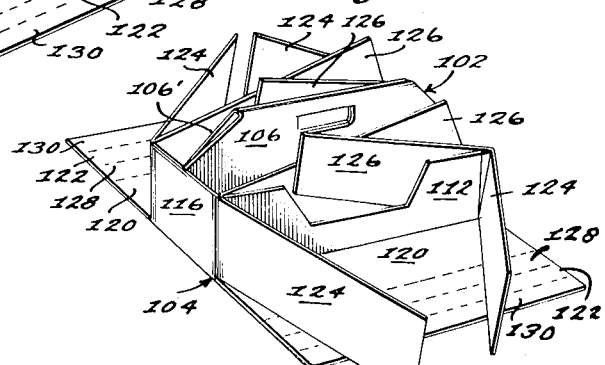
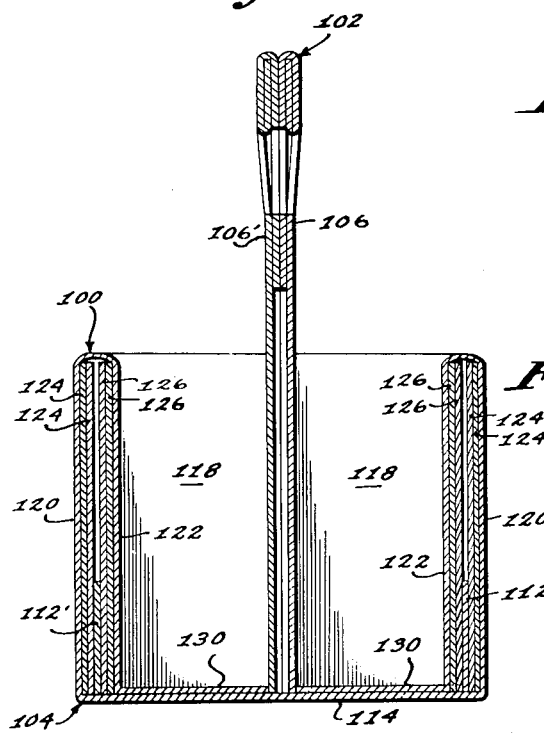
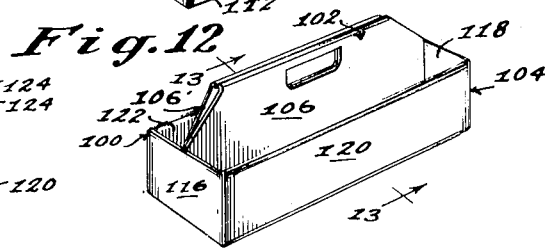
INVENTOR.
SAM B. HOWARD
BY
Parrott & Richards
ATTORNEYS United States Patent Office 2,728,485
Patented Dec. 27, 1955

2,728,485

BOTTLE CARRIER

Sam B. Howard, Atlanta, Ga., assignor to Atlanta Paper Company, a corporation of Georgia Application April 13, 1953, Serial No. 348,423

8 Claims. (Cl. 220—118)

This invention relates generally to bottle carriers, and more particularly to a novel form of large capacity carrier of this sort adapted, for example, to carry twelve or even twenty-four bottles at a time.

The bottle carrier of the present invention is characterized by component handle skeleton and load supporting portions, both of which are separately constituted and separately collapsible, but are adapted for assembly as an errect carrier with the handle skeleton serving as a framing means for the carrier.

These and other features of the bottle carrier forming the subject matter of the present invention are described in detail below in connection with the accompanying drawing, in which:

Fig. 9 is an exploded perspective view showing a handle skeleton in relation to a load supporting portion blank for a modified form of bottle carrier embodying the present invention;

Fig. 10 is a perspective view showing the load supporting portion of Fig. 9 being assembled on the handle skeleton;

Fig. 11 is a further perspective view corresponding to Fig. 10 but showing the load supporting portion in the course of the final step of assembly on the handle skeleton;

Fig. 12 is a perspective view of the completed bottle carrier after assembly according to Figs. 9 to 11, inclusive; and Fig. 13 is a central transverse section of the bottle carrier shown in Fig. 12.

Figure 1:
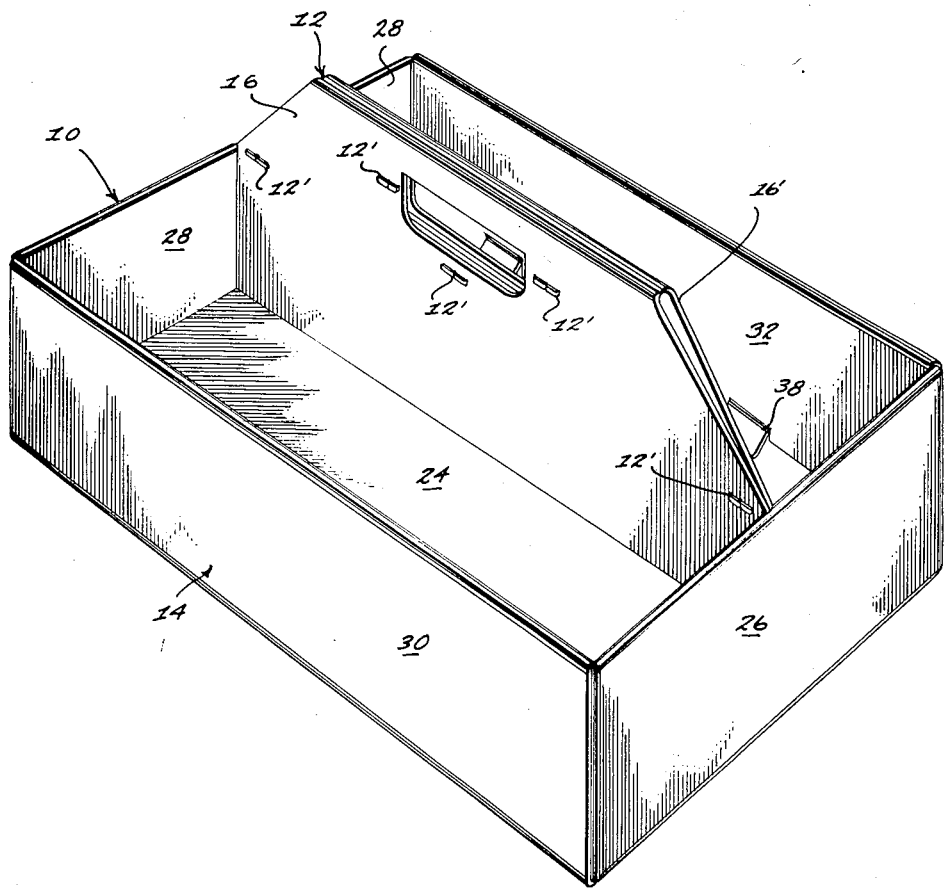
Fig. 1 is a perspective view showing one form of bottle carrier embodying the present invention.
Figure 2:
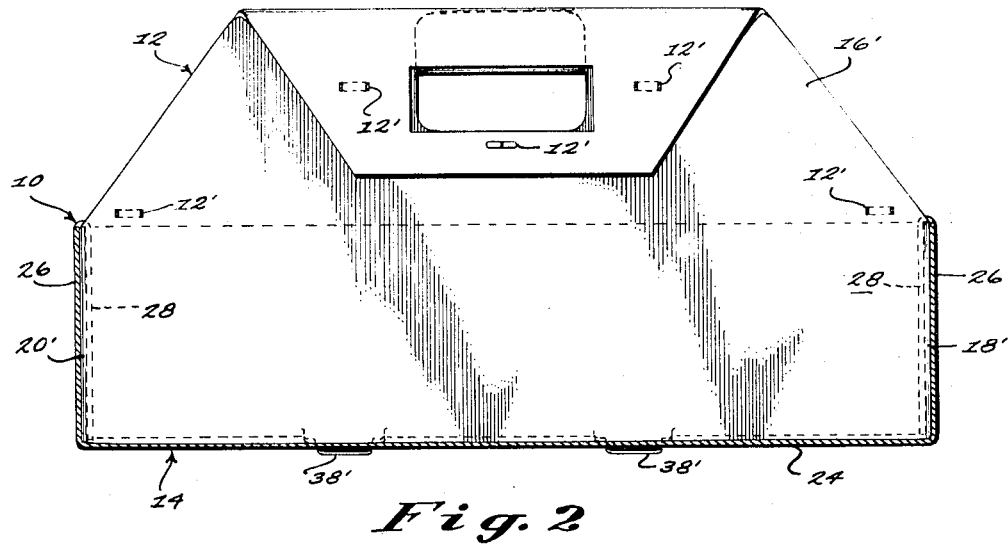
Fig. 2 is a central longitudinal section of the bottle carrier shown in Fig. 1.
Figure 3:
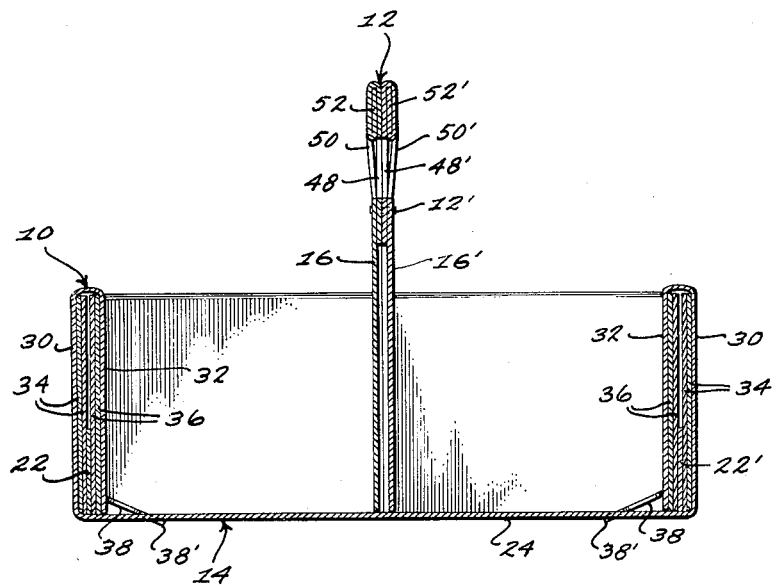
Fig. 3 is a central transverse section of the bottle carrier shown in Fig. 1.

Referring now in detail to the drawings, the form of bottle carrier indicated generally by the reference numeral 10 in Figs. 1 to 3, inclusive, is shown in Fig. 1, as an erect, fully assembled, bottle carrier having the handle skeleton thereof identified generally by the reference numeral 12 and the load supporting portion by the reference numeral 14.

Figure 5:
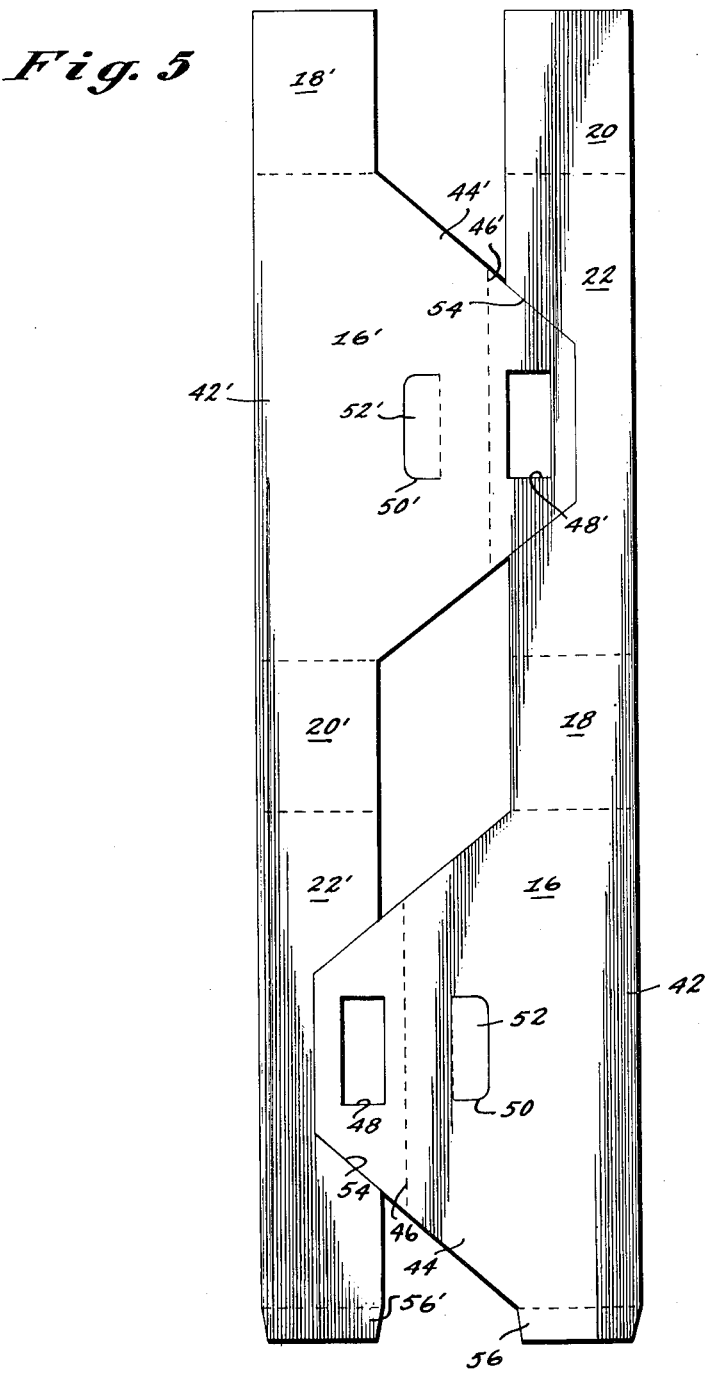
Fig. 5 is a plan view of the matched pair of blanks employed for the bottle carrier handle skeleton according to the present invention, and showing the nesting arrangement thereof.
Figure 6:
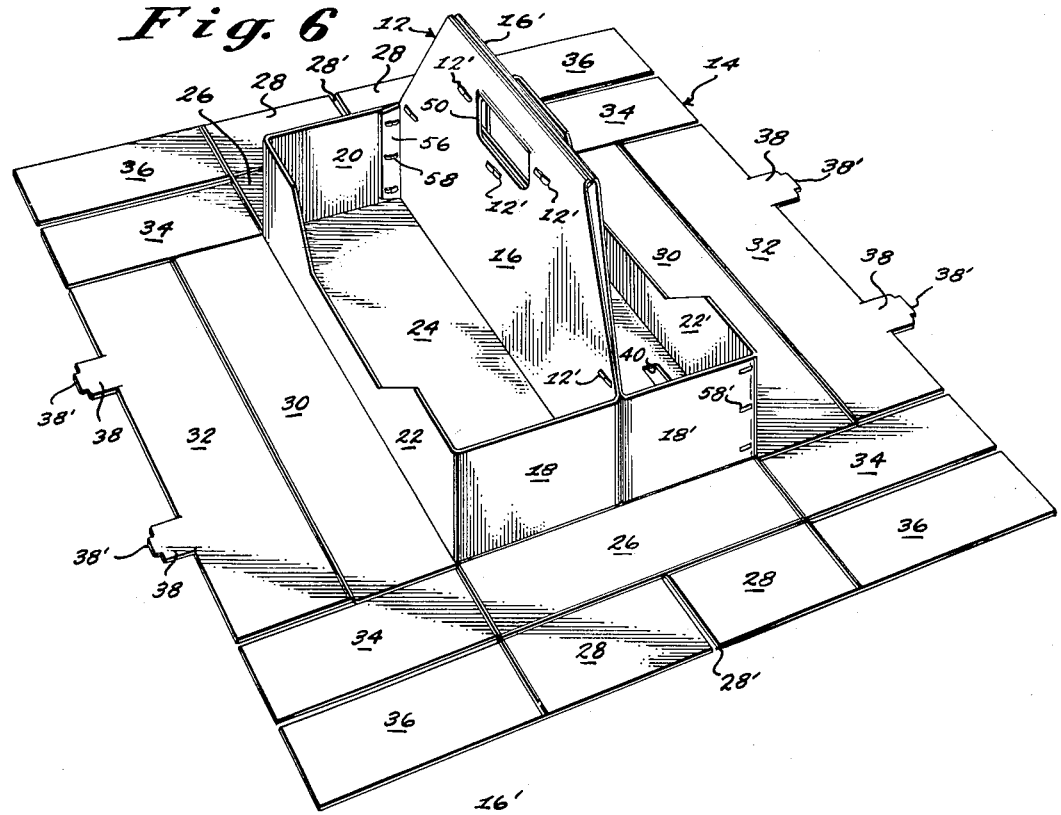
Fig. 6 is a perspective view showing the handle skeleton erected and in place with respect to the blank of Fig. 4 for the load supporting portion to serve as a framing means therefor in assembling the bottle carrier.

Comparing Fig. 1 with Figs. 2 and 3, it will be seen that the handle skeleton 12 comprises a two-part construction in which medial handle sections 16 and 16' are secured together, as by stapling at 12', to form a carrying handle and medial partition for the carrier, and from which end wall framing sections 18 or 18' and 20 or 20' extend and have connected therebetween side wall framing sections 22 or 22' (as shown fully in Figs. 5 and 6).

The related load supporting portion 14 comprises a bottom wall 24, and opposed end and side walls foldably attached at the edges of the bottom wall 24 and made intermediately foldable into outer and inner end wall portions 26 and 28 and inner and outer side wall portions 30 and 32, for assembly in covering relation over the handle skeleton and side wall framing sections 18, 20 and 22 (or 18', 20' and 22'). Also, the outer and inner walls 26 and 28 are formed with laterally extending reinforcing panels 34 and 36, respectively, that are foldable to dispositions on opposite sides of the side wall framing sections 22 and 21, as is described further below. In the embodiment shown in Figs. 1 to 3, the load supporting portion 14 is secured on the handle skeleton 12 by locking tabs 38 provided at the free edges of the inner side walls 32 to interlock in registering apertures 40 formed in the bottom wall 24, the locking tabs 38 having their extending portions narrowed in width as at 38' for insertion through the apertures 40 while the remaining wider portion of the tabs 38 extends to rest on top of the bottom wall 24 and thereby maintaining a locking disposition with the apertures 40.

Figure 4:
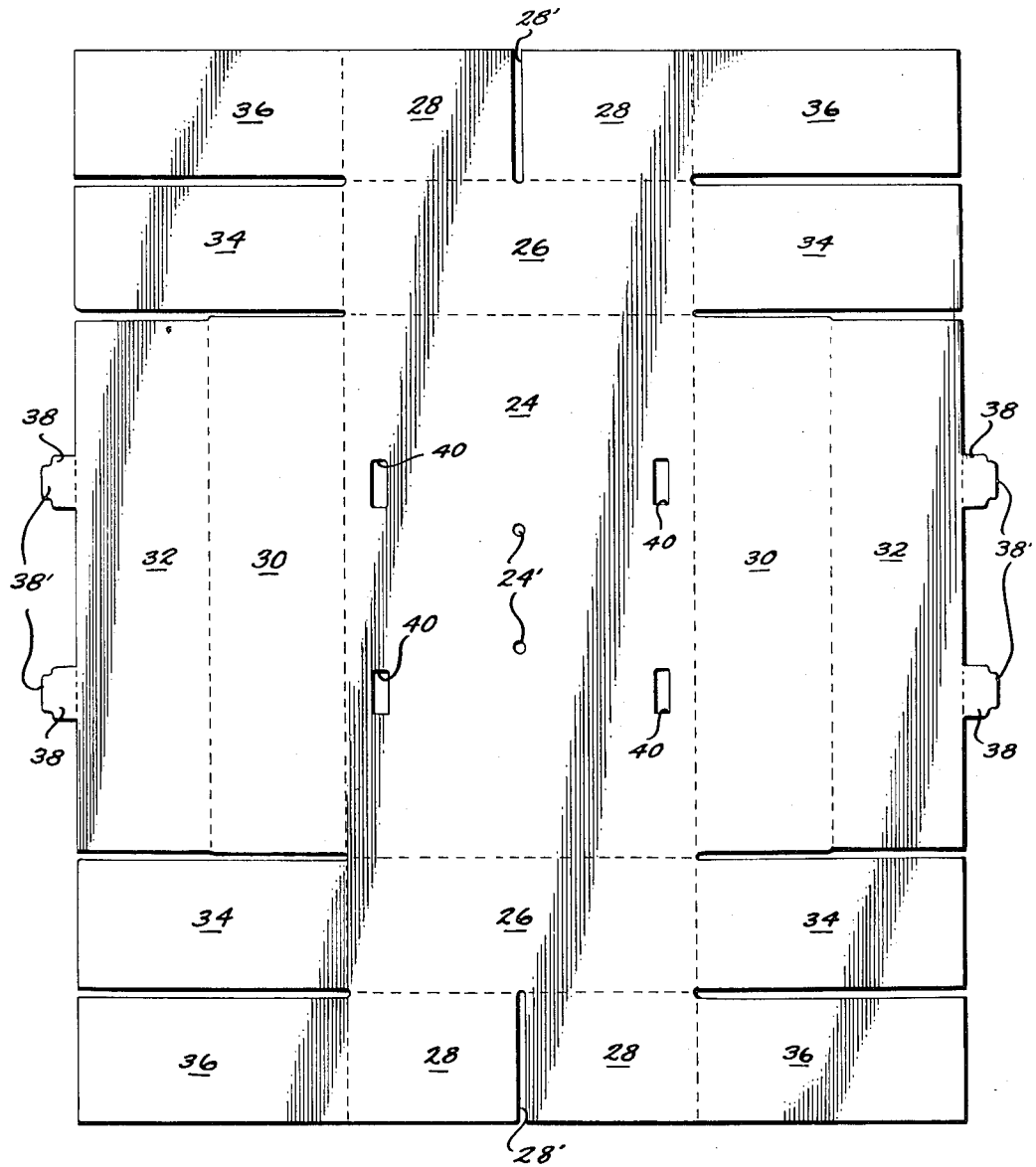
Fig. 4 is a plan view of the form of blank employed for the load supporting portion of the bottle carrier shown in Fig. 1.

Fig. 4 of the drawings shows the form of blank used according to the present invention for the above described load supporting portion 14, it appearing further from the showing in Fig. 4 that the inner end walls 28 are formed with a central slot as at 28' allowing them to clear the medial handle sections 16 and 16' of the handle skeleton 12, and that the bottom wall 24 may be provided with drain apertures as at 24' if desired.

In Fig. 5, a pair of matched blanks is shown such as is used in accordance with the present invention to form the previously noted two-part handle skeleton 12. Each of these blanks comprises a a handle panel section 16 or 16' in which there is provided a medial partition portion 42 or 42' having a longitudinal extent coextensive with that of the bottle carrier 10 to be formed (i. e., with the bottom wall 24 thereof), and a handle portion 44 or 44' tapering therefrom. This tapering handle portion 44 or 44' is made intermediately foldable along a fold line 46 or 46' so that a top part of the handle portion 44 or 44' may be doubled back to reinforce the carrying handle provided by registering hand hold apertures provided at 48 and 50 or 48' and 50', the apertures 50 and 50' having a flap 52 or 52' left hinged therein so that it may be folded back between the doubled parts of the handle portions 44 or 44' to reinforce the carrying handle further (compare Fig. 3).

To provide for this reinforced arrangement of the carrying handle without requiring additional boxboard, the side wall framing sections 22 and 22' are each formed with a tapering notch 54 or 54' centrally of their longitudinal extent and complementary in form to the top part of the handle portion 44 or 44', so that the matched blanks can be nested as shown in Fig. 5. It should also be noted that the notches 54 and 54' do not weaken the side wall framing sections 22 and 22' unduly because of the lateral reinforcing panels 34 and 36 provided on the outer and inner end walls 26 and 28 of the load supporting portion 14.

The matched pair of blanks for the handle skeleton 12 are completed by attaching flaps 56 and 56' by which the handle skeleton end wall and side wall framing sections 18, 20 and 22 (or 18', 20' and 22') are secured, as by stapling at 58 or 58' (see Fig. 6), in proper relation as elements of the handle skeleton 12. It will be seen from Fig. 5 that attaching flaps 56 for one of the matched pair of blanks is arranged directly at one end of the partition portion 42 in the medial panel section 16, and that the remaining end wall framing section 18, side wall framing section 22 and second end wall framing section 20 are arranged serially in that order at the other end of the partition portion 42. The other attaching flap 56' for the second blank of the matched pair, however, is arranged at one end of the side wall framing section 22', and one of the end wall framing sections 20' is joined directly at the other end of the side wall framing section 22' and to one end of the partition portion 42' for the medial panel section 16', with the other end wall framing section 18' joined at the other end of the partition portion 42'. The result of this arrangement is that when the matched pair of handle skeleton blanks are nested in inverted relation, as shown in Fig. 5, they fit compositely within a rectangular outline with each blank of the pair reaching the full length of the outline, so that a very economical use of boxboard is provided for in forming the blanks.

Fig. 6 shows a matched pair of blanks, as described above, secured by the previously mentioned stapling at 12', and 58 and 58', to form the handle skeleton 12, and further shows the handle skeleton 12 erected and arranged in place with respect to a blank for the load supporting portion 14 in preparation for assembly therewith to form a bottle carrier 10. Separately, the handle skeleton 12 is collapsible by virtue of the foldably connected arrangement of its elements, so that it may be shipped and stored in collapsed position along with the flat blanks for the load supporting portion 14 to require a minimum of shipping and storage space or handling trouble until it is desired to assemble bottle carrier 10 therefrom.

In erected position, the handle skeleton 12 may be arranged on the bottom wall panel 24 or the blank for the load supporting portion 14 with the handle panel sections 16 and 16' disposed medially of the bottom wall 24, and with the end and side wall framing sections 18, 18', 20, 20', 22 and 22' reaching coextensively of the length and breadth of the bottom wall 24, as illustrated in Fig. 6.

Figure 7:
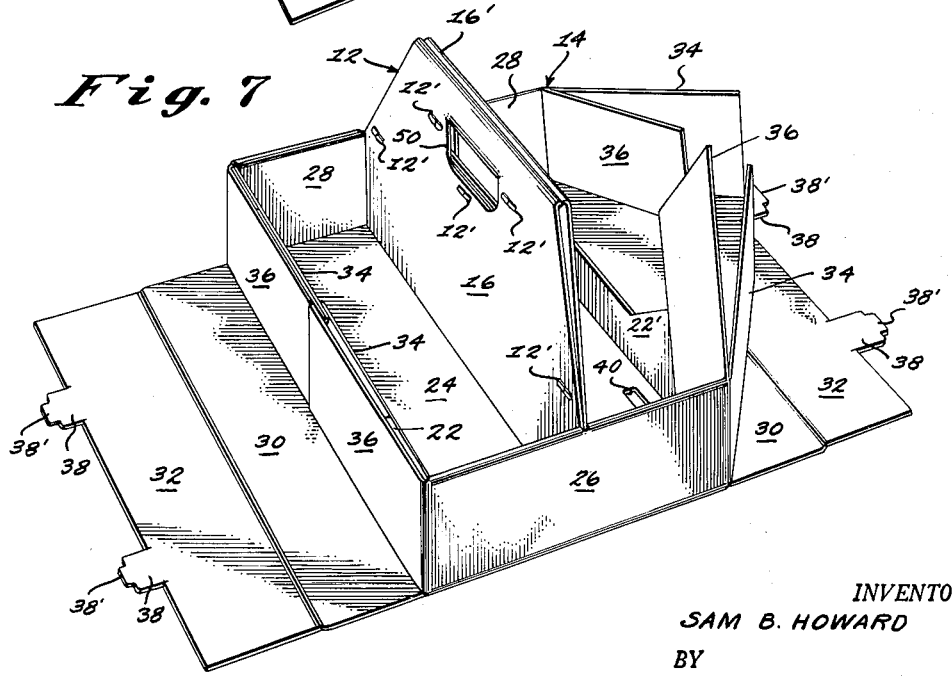
Fig. 7 is a further perspective view corresponding generally to Fig. 6, but showing the load supporting portion in the course of assembly on the handle skeleton.
Figure 8:
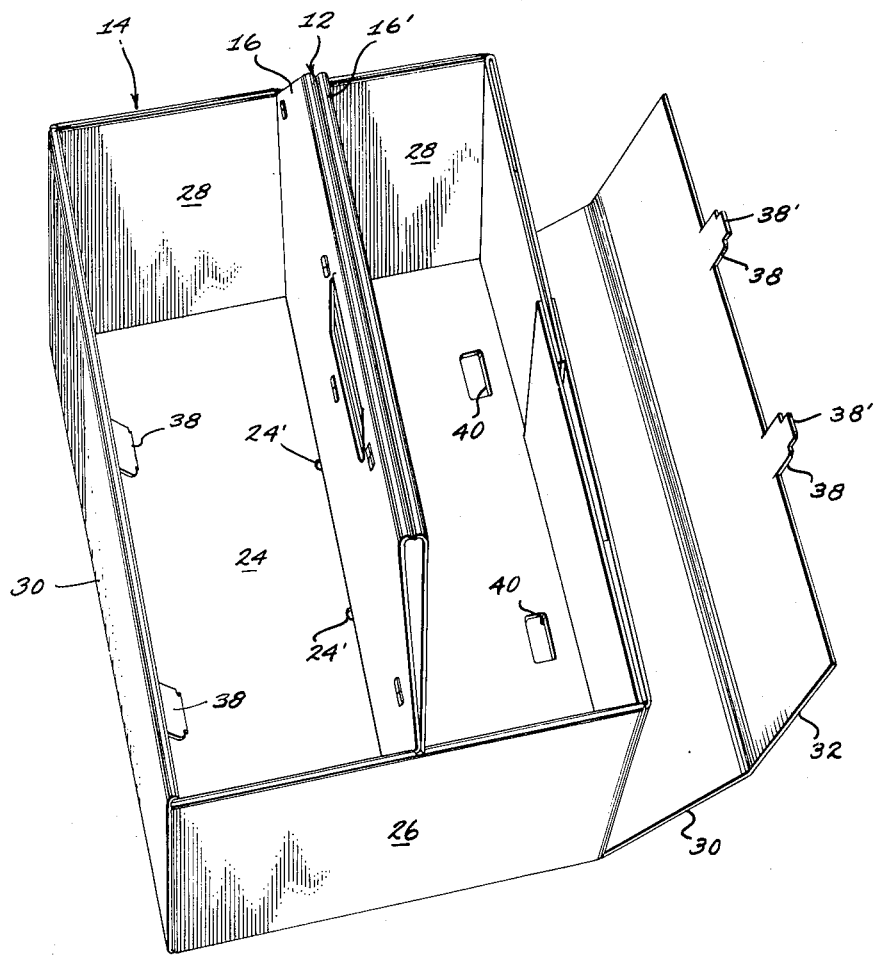
Fig. 8 is still another perspective view showing the load supporting portion just before completion of the final step of assembly on the handle skeleton.

For assembly of the load supporting portion 14 on the handle skeleton 12, the outer and inner end walls 26 and 28 are then folded over the handle skeleton end wall framing sections 18, 18' and 20, 20', and at the same time the related reinforcing panels 34 and 36 carried by the end walls 26 and 28 are disposed on opposite sides of the handle skeleton side wall framing sections 22 and 22', all as indicated in Fig. 7. When this has been done it only remains to fold the outer and inner side walls 30 and 32 of the load supporting portion 14 over the handle skeleton side wall framing sections 22 and 22', as illustrated in Fig. 8, and fix the locking tabs 38 in the bottom wall apertures 40 to obtain a completely assembled bottle carrier 10 of the type shown in Fig. 1.

It should be noted that in the assembly operation just described above, the handle skeleton 12 provides a fully adequate framing means for the load supporting portion 14, so that no auxiliary assembly jigs or fixtures are needed and, further, no stapling or other securing operation requiring special equipment is necessary in completing the assembly. Accordingly, the bottle carrier 10 is arranged according to the present invention for assembly from the component handle skeleton 12 and load supporting portion 14 by simple hand manipulation without the necessity for use of any assembly tools or equipment whatever.

Another important feature of the present invention is that the handle skeleton 12, when assembled in a bottle carrier 10, is substantially protected from damage by the manner in which the load supporting portion is disposed in covering relation at the end and side wall framing sections 18, 18', 20, 20', 22 and 22'. Also, because the handle skeleton 12 is separately constituted, it may be formed of relatively heavier boxboard than the load supporting portion 14 to provide a sufficiently sturdy structure for reuse by assembling a new load supporting portion 14 thereon whenever the first assembled supporting portion 14 becomes damaged and needs replacing. It has been found in actual practice, for example, that the handle skeleton 12 can readily be made to outlast at least three of the load supporting portions 14, and thereby obtain a further very substantial element of economy as a result of the structural arrangement provided by the present invention.

Figs. 9 to 13, inclusive, of the drawings illustrate a modified form of bottle carrier constructed in accordance with the present invention as indicated by the reference numeral 100 in Figs. 12 and 13. The previously described bottle carrier 10 is shown in Figs. 1 to 8, inclusive, proportioned suitably for accommodating twenty-four bottles (i. e., two rows of six bottles on each side of the handle section of the handle skeleton 12), and in this respect is comparable to, and may be used instead of, the partitioned wooden crates or cases in which bottled soft drinks, for example, are commonly distributed by bottlers. The structure of the bottle carrier 10 provides fully adequate strength for use in place of the wooden crates, and offers the further advantage of being much more easily handled by a customer who wishes to purchase an entire case. The modified bottle carrier 100 is illustrated in an alternative smaller size proportioned to carry twelve bottles (i. e., one row of six bottles at each side), but is otherwise formed in exact correspondence with the bottle carrier 10, except for a different arrangement for securing the final assembly, as will be described presently, and which different arrangement may be used alternatively with that previously noted in the bottle carrier 10, as desired.

In Fig. 9, a handle skeleton 102 is shown in exploded assembly relation to a blank for a load supporting portion 104 for the modified form of bottle carrier 100. As in the case of the handle skeleton 12 for the bottle carrier 10, the handle skeleton 102 comprises a two-part construction formed by medial handle panel sections 106 and 106', end wall framing sections 108 and 108', and 110 and 110', and side wall framing sections 112 and 112'. Also, the blank for the load supporting portion 104 comprises a bottom wall 114, proportioned in relation to the handle skeleton 102 as indicated by projection lines in Fig. 9; and opposed outer and inner end walls 116 and 118, and opposed outer and inner side walls 120 and 122, foldably joined along the respective end and side edges of the bottom wall 114. The outer and inner end walls 116 and 118 have laterally extending reinforcing panels 124 and 126 foldably joined thereon and the outer end walls 116 are centrally slotted as at 116' to clear the handle skeleton 102, as in the previously described embodiment; while the inner side walls 122 are made intermediately foldable along fold lines 128 and have inner bottom wall panels 130 foldably joined thereto in order to provide the different assembly arrangement employed in the modified bottle carrier 100, as mentioned above.

Fig. 10 shows the load supporting portion 104 in the course of assembly on the handle skeleton 102 to form the bottle carrier 100, just as has already been described above in connection with the bottle carrier 10, while Fig. 11 shows the final assembly step in the course of completion. This final assembly step differs somewhat for the bottle carrier 100 because of the different assembly securing arrangement used, which arrangement employs the inner bottom wall panels 130 in abutting relation to the medial panel sections 106 and 106' of the handle skeleton 102 to secure the assembly (compare Fig. 13). In order to provide this abutting relation of the inner bottom wall panels 130, they are proportioned with approximately half the width of the main bottom wall 114, and as this half width will correspond only to the width required by one row of bottles in the smaller size bottle carrier 100, the inner side walls 122 must be made collapsible, as is done by the intermediate fold lines 128, in order to allow folding of them over the side wall framing sections 110 and 110', as illustrated in Fig. 11, and final securing disposition of the inner bottom walls 130 in abutting relation with the handle skeleton medial handle sections 106 and 106' to form the completed bottle carrier 100 as shown in Figs. 12 and 13.

The use of the inner bottom wall panels 130 to secure the assembly of the bottle carrier 100 has the advantage of providing a double thickness bottom for the carrier, and further eliminates any projecting elements (such as the extending locking tab portions 138' in the bottle carrier 10) at the bottom surface of the carrier that might under some circumstances impede its handling, as where it was desired to slide the loaded carriers on a surface in which there were irregularities or the like at which any element projecting below the carrier bottom might catch. It will be apparent that the same assembly securing arrangement could be used too, as desired, in forming the first described bottle carrier 10, although in that event it would not be necessary to make the inner side walls 32 intermediately foldable because of the greater width employed in the larger size bottle carrier 10.

The present invention has been described in detail above for purposes of illustration only and is not intended to be limited by this description or otherwise except as defined in the appended claims.

I claim:

1. A paperboard carton of the type adapted for carrying bottles and other similar containers, said carton comprising a handle skeleton and a load supporting portion, said handle skeleton being formed with a medial handle section and end and side wall framing sections joined thereto, and said load supporting portion including a bottom wall with outer and inner end and side walls joined thereto and foldable over said handle skeleton framing sections for assembly therewith in covering relation.

2. A paperboard carton of the type adapted for carrying bottles and other similar containers, said carton comprising a separately constituted handle skeleton having a medial handle panel section with opposed pairs of end wall framing sections foldably attached thereto and opposed side wall framing sections foldably connected between respective end wall framing sections of said pairs, whereby said handle skeleton is rendered collapsible, and a separately constituted load supporting portion including a bottom wall and opposed end and side walls foldably attached at the edges of said bottom wall, said end and side walls being intermediately foldable into outer and inner portions for assembly over said framing sections in covering relation.

3. A paperboard carton of the type adapted for carrying bottles and other similar containers, said carton comprising a separately constituted handle skeleton having a medial handle panel section and end and side wall framing sections foldably secured therewith for movement between erect and collapsed positions with respect thereto, and a separately constituted load supporting portion including a bottom wall coextensive with the lateral and longitudinal portions of said end and side wall framing sections in erect position and outer and inner end and side walls foldably joined on said bottom wall for folding over said framing sections in covering relation and thereby assembling said load supporting portion on said handle skeleton.

4. A paperboard carton of the type adapted for carrying bottles and other similar containers, said carton comprising a handle skeleton and a load supporting portion, each of which are separately constituted for erection from a collapsed condition, and which are interrelated for assembly as an erect carton, said handle skeleton being formed with a medial handle panel section providing a medial partition in said carton for the full depth thereof and end and side wall framing sections foldably secured therewith, and said load supporting portion including a bottom wall coextensive with the lateral and longitudinal extent of said framing sections in erect position and outer and inner end and side walls foldably joined on said bottom wall for folding over said framing sections in covering relation.

5. A paperboard carton as defined in claim 4 and further characterized in that said inner side walls have foldably joined thereon inner bottom wall panels proportioned with substantially half the width of said first mentioned bottom wall panel and thereby adapted for abutting said medial handle panel section to secure said load supporting portion in assembled relation on said handle skeleton.

6. A paperboard carton as defined in claim 5 and further characterized in that said inner side walls are intermediately foldable for allowing abutting disposition of said inner bottom wall panels with respect to said medial handle panel section.

7. A paperboard carton as defined in claim 4 and further characterized in that said outer and inner end walls are formed with laterally extending reinforcing panels foldably joined thereto and disposed on opposite sides of said side wall framing sections between said outer and inner side walls.

8. A matched pair of paperboard blanks for forming a handle skeleton on which a carrying carton may be framed, each of said blanks comprising a handle panel section tapering from a partition portion, having a longitudinal extent coextensive with that of the carton to be formed, to a handle portion of lesser longitudinal extent, a first half end wall framing section foldably joined to said handle panel section at an end of said partition portion, and a side wall framing section of equal longitudinal extent with the partition portion of said handle panel section foldably joined to said first end wall framing section, said side wall framing section having a tapering notch formed therein centrally of its longitudinal extent at the edge thereof forming a portion of the same blank edge at which said tapering handle portion of the handle panel section is arranged, said notch being complementary with respect to the tapering shape of said handle portion, whereby said pair of blanks may be nested in inverted relation with respect to each other, one of said blanks having a second half end wall framing section foldably joined to the handle panel section thereof at the other end of said partition portion, and the other blank having a second half end wall framing section foldably joined to the side wall framing section thereof, whereby said pair of blanks when nested fit compositely within a rectangular outline with each blank of said pair reaching the full length of said outline.

References Cited in the file of this patent

UNITED STATES PATENTS 2,632,595    Finkbone            Mar. 24, 1953

FOREIGN PATENTS 605,244    Great Britain           July 19, 1948